Patented Dec. 17, 1935

2,024,470

UNITED STATES PATENT OFFICE 2,024,470

PROCESS FOR THE MANUFACTURE OF AN ACCELERATOR FOR RUBBER VULCANIZATION

Clayton Olin North, Akron, Ohio, assignor to The Rubber Service Laboratories Company, Akron, Ohio, a corporation of Ohio No Drawing. Original application September 21, 1926, Serial No. 136,893. Divided and this application January 11, 1928, Serial No. 246,089

8 Claims. (Cl. 260—130)

This invention relates to the manufacture of accelerators for rubber vulcanization processes. The class of accelerators concerned comprises the reaction product of carbon disulphide upon the aldehyde derivative of a Schiff's base. More particularly, the invention comprises a process for the preparation of those accelerators formed by the reaction of carbon disulphide on the aliphatic aldehyde derivative of those Schiff's bases resulting from the interaction of equi-molecular proportions of an aromatic primary amine with an aliphatic aldehyde. The invention also comprises the manufacture of accelerators by the action of carbon disulphide on aldehyde amine products wherein the amine and aldehyde have been preliminarily combined in other than equi-molecular proportions of aldehyde to amine.

In United States Patent No. 1,467,984, granted to me September 11, 1923, I have disclosed and claimed as vulcanization accelerators, an aldehyde reaction product of a Schiff's base. According to this patent, such accelerators as a class comprise products wherein the aldehyde and amine have been combined in other than equi-molecular proportions and particularly comprises those products wherein two molecular proportions of an amine, such as aniline, have combined with three molecular proportions of an aldehyde, such as acetaldehyde. The present application discloses a process for the manufacture of the compounds resulting from the treatment of accelerators of the type claimed in the patent hereinbefore referred to, with carbon disulphide. The carbon disulphide, as hereinafter disclosed, may be combined with the aldehyde derivative of a Schiff's base, in equi-molecular or in other proportions.

Such a compound may be readily obtained by treating an aldehyde derivative of a Schiff's base, prepared according to the process set forth in the patent hereinbefore referred to, with an excess of carbon disulphide. Thus, for example, one molar portion (264 parts) of the unimolecular acetaldehyde derivative of the Schiff's base, said Schiff's base being obtained by combining two molar portions of aniline with two molar portions of acetaldehyde is refluxed gently with an excess of carbon disulphide. The temperature of the mass is maintained for a period of several hours approximately at but preferably not greatly above the boiling point of carbon disulphide. Thus, for example, a desirable and effective temperature range may comprise from 45 to 55° C. or thereabout. During the refluxing action, hydrogen sulphide is evolved and the refluxing is continued until evolution of this gas has substantially ceased. Any uncombined carbon disulphide is then removed by distillation from the mass and the resulting product, a brownish to black resinous mass, comprises one of my new class of accelerators. The product in this particular example, apparently comprises the combination of 1.5 mols of carbon disulphide with each mol taken of the aldehyde derivatives of a Schiff's base.

Accelerators similar in their action in a rubber mix to the one described above may be prepared by reacting carbon disulphide upon the reaction product of other aldehydes and amines than those hereinbefore set forth. Thus, for example, a reaction product of acrolein aniline, said product comprising the acrolein derivative of the Schiff's base acrolein aniline, was prepared and this product was refluxed with carbon disulphide in the manner as hereinbefore described. The resulting product was a hard and brittle solid.

The reaction product of ortho-toluidine and acetaldehyde, wherein the amine and aldehyde are combined in other than equi-molar portions, for example, in the proportion of one mol of amine to 2.25 mols of aldehyde, has been reacted with carbon disulphide in the manner as described to form one of my new type of compounds.

The reaction of the various aldehyde-amine reaction products with carbon disulphide in the production of compounds of the type herein set forth may be carried out in other ways than that particularly described. Thus, for example, an aldehyde-amine reaction product may be heated under pressure with an excess of carbon disulphide or vapors of carbon disulphide may be led through an aldehyde-amine reaction product maintained under a temperature of from 100° C. to 160° C.

Another example of my new class of compounds comprises the carbon disulphide derivative of the compound formed by the combination of aniline with butyl aldehyde. The reaction product of three molar portions of butyl aldehyde with one molar portion of aniline prepared by refluxing 216 parts of butyl aldehyde with 93 parts of aniline for a period of time and separating water of condensation therefrom, was treated with an excess of carbon disulphide. A reaction commenced at once in which hydrogen sulphide was evolved and heat was liberated. To avoid loss of the carbon disulphide, the reaction preferably was carried out in a still having a reflux condenser attached thereto. The refluxing action was allowed to continue until evolution of hydrogen sulphide substantially ceased, whereupon any uncombined carbon disulphide was removed by distillation from the still and a dark reddish liquid resulted.

A further example of the class of compounds disclosed in the present application comprises the carbon disulphide derivative of a reaction product of aniline and heptaldehyde. A mixture of 228 parts (2 molar portions) of heptaldehyde and 93 parts (1 molar portion) of aniline was refluxed for a period of five hours at from 155° C. to 180° C., or for a longer time at a lower temperature. The reaction product was cooled down, water of condensation was removed therefrom and an excess of carbon disulphide was added to the material. The mass was refluxed as previously described until hydrogen sulphide was no longer evolved and the uncombined carbon disulphide was removed from the dark reddish liquid reaction product.

Other members of this class of compounds may be readily manufactured by reacting carbon disulphide upon the reaction product of aromatic primary amines, such as the toluidines, the xylidines and the like, with aldehydes preferably of the aliphatic series, such as formaldehyde, acetaldehyde, propionaldehyde, butyl aldehyde, hexoicaldehyde, heptaldehyde, aldol, acrolein, crotonaldehyde and the like. The reaction product of an aldehyde with an amine which is combined as described with carbon disulphide, may comprise the product formed by the reaction of one mol of an amine with two mols of an aldehyde, or of two mols of the amine with three mols of an aldehyde, or of one mol of the amine with three mols of an aldehyde, or broadly by combining one mol of an aromatic primary amine with from one-half to three mols of an aliphatic aldehyde.

The examples set forth are to be understood as illustrative only and not at all limitative of the invention. The invention is limited solely by the claims attached hereto as a part of this specification wherein it is intended to claim the invention as broadly as possible in view of the prior art.

This case is a division of Serial No. 136,893, filed September 21, 1926, which on October 22, 1929 matured into United States Patent No. 1,732,770.

What I claim is:

1. The process of preparing an accelerator comprising the reacting of carbon disulfide upon a preformed aldehyde derivative of a Schiff's base, said aldehyde derivative consisting of the reaction product of from 1½ to 3 mols of an aliphatic aldehyde with 1 mol of an aromatic primary amine.

2. The process of preparing an accelerator comprising the reacting of carbon disulphide upon the preformed reaction product of an aliphatic aldehyde and an aromatic primary amine, said aldehyde-amine product being obtained by combining from 1½ to 3 mols of said aldehyde with one mol of the amine.

3. The process of preparing an accelerator comprising the reacting of carbon disulphide upon the performed condensation product of from 3 to 1½ molar portions of an aliphatic aldehyde upon 1 molar portion of an aromatic primary amine.

4. As a new product an accelerator prepared by reacting carbon disulphide upon a preformed aldehyde derivative of a Schiff's base said aldehyde derivative consisting of the reaction product of from 1½ to 3 mols of an aliphatic aldehyde with 1 mol of an aromatic primary amine.

5. As a new product an accelerator prepared by reacting carbon disulphide upon the preformed reaction product of an aliphatic aldehyde and an aromatic primary amine, said aldehyde-amine product being obtained by combining from 1½ to 3 mols of said aldehyde with one mol of the amine.

6. As a new compound an accelerator prepared by reacting carbon disulphide upon the preformed condensation product of from 3 to 1½ molar portions of an aliphatic aldehyde upon 1 molar portion of an aromatic primary amine.

7. The process of preparing a new compound which comprises causing carbon bisulfide to react on the condensation product of 1 mol of a primary aromatic amine and from two to four mols of butyraldehyde.

8. The process of preparing a new compound which comprises causing carbon bisulfide to react on the condensation product of 1 mol of aniline and from two to four mols of butyraldehyde.

CLAYTON OLIN NORTH.